US009727545B1

(12) United States Patent
Segalis et al.

(10) Patent No.: US 9,727,545 B1
(45) Date of Patent: Aug. 8, 2017

(54) SELECTING TEXTUAL REPRESENTATIONS FOR ENTITY ATTRIBUTE VALUES

(71) Applicant: Google Inc., Mountain View, CA (US)

(72) Inventors: Eyal Segalis, Tel Aviv (IL); Yaniv Leviathan, Tel Aviv (IL); Yossi Matias, Tel Aviv (IL); Gal Chechik, Los Altos, CA (US); Yoav Tzur, Tel Aviv (IL); Ran El Manor, Savyon (IL)

(73) Assignee: Google Inc., Mountain View, CA (US)

( * ) Notice: Subject to any disclaimer, the term of this patent is extended or adjusted under 35 U.S.C. 154(b) by 228 days.

(21) Appl. No.: 14/096,746

(22) Filed: Dec. 4, 2013

(51) Int. Cl.
*G06F 7/00* (2006.01)
*G06F 17/30* (2006.01)
*G06F 17/24* (2006.01)

(52) U.S. Cl.
CPC ........ *G06F 17/24* (2013.01); *G06F 17/30864* (2013.01)

(58) Field of Classification Search
CPC ........ G06F 17/30424; G06F 17/30864; G06F 17/30477; G06F 17/30867; G06F 17/30554
USPC ........................................................ 707/769
See application file for complete search history.

(56) References Cited

U.S. PATENT DOCUMENTS

| | | | | |
|---|---|---|---|---|
| 8,370,348 B1* | 2/2013 | Reilly | ................... | G06Q 30/02 707/731 |
| 2007/0219980 A1* | 9/2007 | Songfack | .......... | G06F 17/30699 |
| 2009/0077056 A1* | 3/2009 | Ravikumar | ....... | G06F 17/30867 |
| 2009/0327896 A1* | 12/2009 | Pall | ........................ | H04L 65/605 715/730 |
| 2010/0228715 A1* | 9/2010 | Lawrence | ........... | G06F 17/3053 707/706 |
| 2010/0241507 A1* | 9/2010 | Quinn | .................... | G06Q 30/02 705/14.42 |
| 2011/0282861 A1* | 11/2011 | Bergstraesser | .... | G06F 17/30507 707/710 |
| 2011/0307483 A1* | 12/2011 | Radlinski | .......... | G06F 17/30864 707/731 |
| 2011/0320437 A1* | 12/2011 | Kim | .................. | G06F 17/30522 707/722 |
| 2012/0084667 A1* | 4/2012 | Hickman | ............... | G06Q 30/02 715/751 |

(Continued)

FOREIGN PATENT DOCUMENTS

| | | |
|---|---|---|
| WO | 2013/066647 | 5/2013 |
| WO | 2014/035709 | 3/2014 |

*Primary Examiner* — Hosain Alam
*Assistant Examiner* — Nicholas Allen
(74) *Attorney, Agent, or Firm* — Fish & Richardson P.C.

(57) ABSTRACT

Methods, systems, and apparatus, including computer programs encoded on computer storage media, for selecting textual representations for entity attribute values. One of the methods includes receiving, for presentation to a user, data identifying a relevant entity and a respective presentation attribute value for each of a plurality of presentation attributes associated with the relevant entity; obtaining user profile data for the user; selecting a respective textual representation for each of the presentation attribute values, wherein selecting the textual representations comprises selecting a first alternative textual representation for a first presentation attribute value based on the user profile data; and providing data identifying the entity and the textual representations for presentation to the user.

26 Claims, 5 Drawing Sheets

(56) References Cited

U.S. PATENT DOCUMENTS

| | | | |
|---|---|---|---|
| 2012/0323828 A1* | 12/2012 | Sontag | G06F 17/30011 706/12 |
| 2013/0007587 A1* | 1/2013 | Marantz | G06F 17/30867 715/234 |
| 2013/0080266 A1* | 3/2013 | Molyneux | G06Q 10/00 705/14.72 |
| 2013/0103683 A1* | 4/2013 | Haveliwala | G06F 17/30867 707/732 |
| 2013/0144605 A1* | 6/2013 | Brager | G06F 17/3061 704/9 |
| 2013/0166578 A1* | 6/2013 | Papineni | G06F 17/30994 707/755 |
| 2013/0187926 A1* | 7/2013 | Silverstein | G06Q 10/105 345/440 |
| 2013/0212487 A1* | 8/2013 | Cote | G06F 3/048 715/745 |
| 2013/0218912 A1* | 8/2013 | Howard | G06F 17/30657 707/754 |
| 2013/0226995 A1* | 8/2013 | Etheredge | G01L 27/00 709/203 |
| 2013/0297590 A1* | 11/2013 | Zukovsky | G06F 17/30867 707/722 |
| 2014/0067816 A1 | 3/2014 | Kanungo et al. | |
| 2014/0136518 A1 | 5/2014 | Shum et al. | |

* cited by examiner

SELECTING TEXTUAL REPRESENTATIONS FOR ENTITY ATTRIBUTE VALUES

BACKGROUND

This specification relates to Internet search engines.

Internet search engines aim to identify resources, e.g., web pages, images, text documents, and multimedia content, that are relevant to a user's information needs and to present information about the resources in a manner that is most useful to the user. Internet search engines generally return a set of search results, each identifying a respective resource, in response to a user-submitted query.

SUMMARY

This specification describes technologies that relate to selecting textual representations for values of attributes of an entity.

In general, one innovative aspect of the subject matter described in this specification can be embodied in methods that include the actions of receiving, for presentation to a user, data identifying a relevant entity and a respective presentation attribute value for each of a plurality of presentation attributes associated with the relevant entity; obtaining user profile data for the user; selecting a respective textual representation for each of the presentation attribute values, wherein selecting the textual representations comprises selecting a first alternative textual representation for a first presentation attribute value based on the user profile data; and providing data identifying the entity and the textual representations for presentation to the user. Other embodiments of this aspect include corresponding systems, apparatus, and computer programs, configured to perform the actions of the methods, encoded on computer storage devices. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method can further include: receiving a search query from the user, wherein the relevant entity is a relevant entity for the search query, and wherein providing data identifying the entity and the textual representations for presentation to the user comprises providing the data identifying the entity and the textual representations for presentation as part of a knowledge panel that identifies the relevant entity and includes content that is relevant to the relevant entity.

The user profile data for the user can include a respective user attribute value for each of one or more user attributes associated with the user. Selecting the first alternative textual representation for the first presentation attribute value based on the user profile data can include: accessing data identifying one or more templates, wherein each template defines a respective alternative textual representation for a respective presentation attribute, and wherein each template has a respective triggering test for applying the template; determining that the first presentation attribute value and the one or more user attribute values satisfy the triggering test for applying a first template from among the plurality of templates; and selecting the alternative textual representation defined by the first template as the textual representation for the first presentation attribute value.

The triggering test for applying the first template can include a criterion for a measure of relatedness between the first presentation attribute value and a first user attribute value of the plurality of user attribute values. The alternative textual representation defined by the first template can be a user-specific representation, a user-specific representation being a representation having text that depends on the value of a particular user attribute.

The method can further include obtaining a default textual representation for each of the presentation attribute values. The alternative textual representation for the first presentation attribute value can be in a same language as the default textual representation for the first presentation attribute value. Selecting a respective textual representation for each of the presentation attribute values can further include: determining that a second presentation attribute value does not satisfy the triggering test for applying any of the plurality of templates; and selecting the default textual representation for the second presentation attribute value as the textual representation for the second presentation attribute value.

The method can further include: determining that the user profile data does not include a value for the first user attribute value; and inferring the first user attribute value from attribute values of a user device of the user or a network connection of the user device.

The subject matter described in this specification can be implemented in particular embodiments so as to realize one or more of the following advantages. The information needs of users requesting information about an entity can be better satisfied. Users can be provided with more relevant information about entities that are of interest to the users. In particular, textual representations of entity attribute values can be customized based on user profile data to provide entity information that is more likely to be informative for the user seeking the information than the default textual representations of the entity attribute values.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
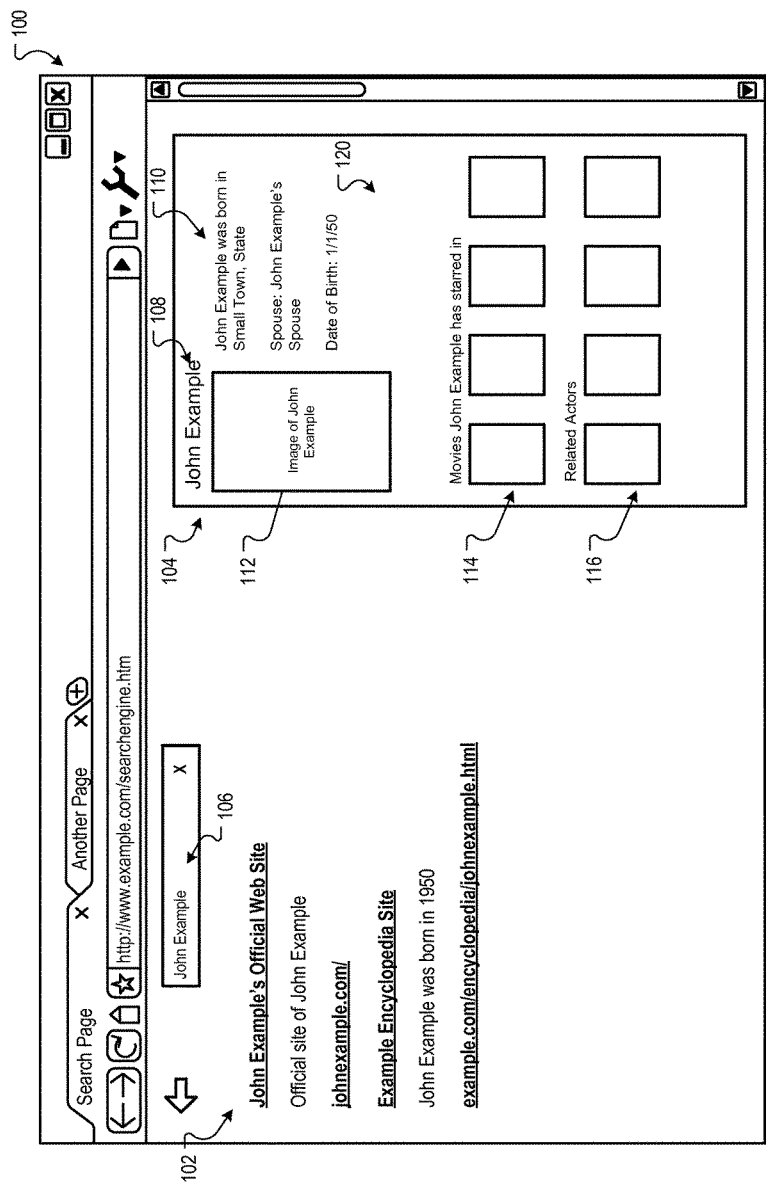
FIG. 1A shows an example search results page for an example search query "John Example."

FIG. 1A shows an example search results page 100 for an example search query 106 "John Example." The search results page 100 includes search results 102 and a knowledge panel 104. The search results 102 and the knowledge panel 104 are generated by a search system in response to the search query 106.

The search results 102 each identify a respective resource and generally include respective titles and respective text snippets that are extracted from the resources identified by the search results. The search system can generate the search results 102 using conventional search engine techniques.

A knowledge panel is a user interface element that provides content related to a relevant entity in response to a received search query. The content includes textual representations of values of attributes associated with the relevant entity and, optionally, other information about the entity. The relevant entity is an entity that has been classified by the search system as being relevant to the received search query. Example entities include people, places, countries, landmarks, animals, historical events, organizations, businesses, sports teams, sporting events, movies, songs, albums, games, works of art, fictional characters, and so on.

In the illustrated example of FIG. 1A, the search system has classified the actor John Example as being relevant to the search query 106 and included the knowledge panel 104 in the search results page 100. The knowledge panel 104 provides content related to the actor John Example. The content includes textual representations of values of attributes associated with the entity. For example, the knowledge panel 104 includes a textual representation 110 ("John Example was born in Small Town, State") of the value of a "birth place" attribute associated with the actor John Example. A knowledge panel may also include other information associated with the entity. For example, the knowledge panel 104 includes an image 112 of the actor, images 114 that identify movies that the actor has starred in, and images 116 of other actors who may be relevant to the query.

In some circumstances, the search system may select an alternative textual representation for one or more of the attribute values in a knowledge panel based on user profile data for a user submitting the search query.

Figure 1B:
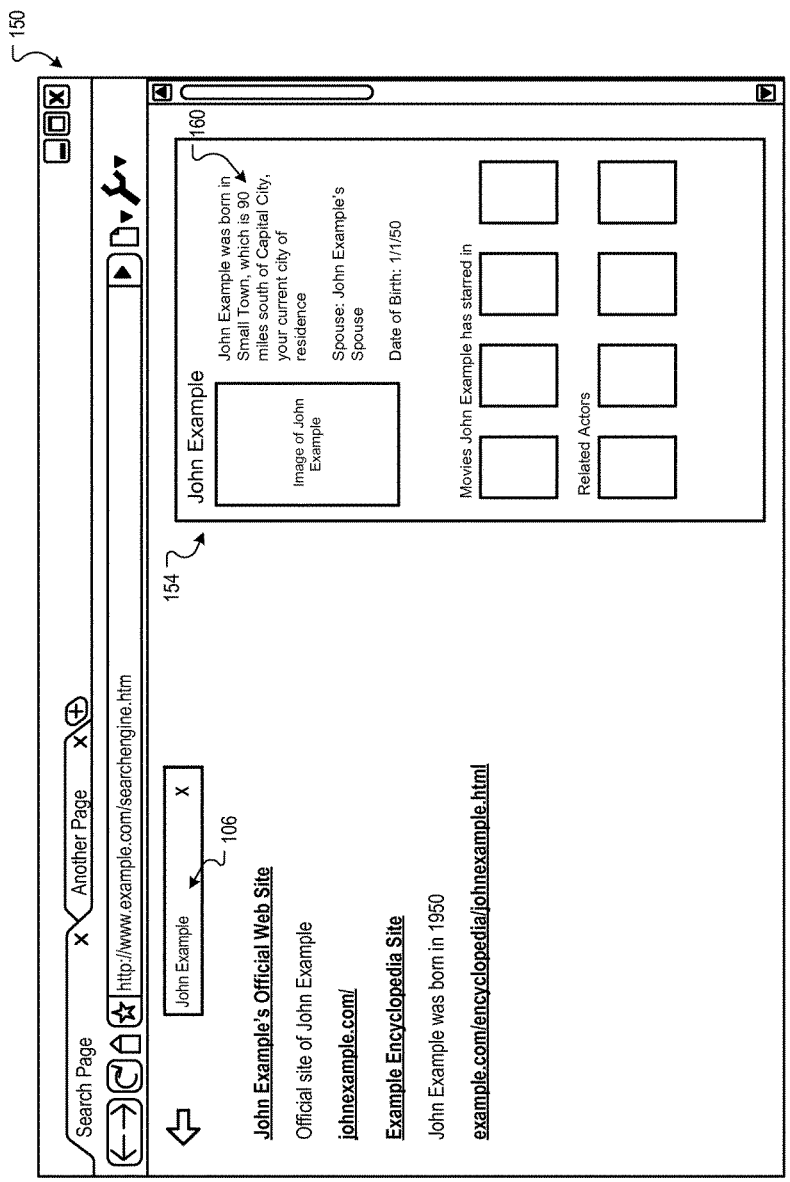
FIG. 1B shows another example search results page for the search query "John Example."

FIG. 1B shows another example search results page 150 for the search query 106 "John Example." The search results page 150 includes a knowledge panel 154 that provides content related to the actor John Example. The knowledge panel 154 includes an alternative representation 160 ("John Example was born in Small Town, which is 90 miles south of Capital City, your current city of residence") of the value of a "birth place" attribute associated with the actor John Example. The search system selected the alternative representation for this attribute based on user profile data obtained by the search system for the user submitting the search query 106. For example, the search system may have selected the alternative representation based on determining that the distance between the city of residence of the user submitting the search query 106 (Capital City) and Small Town was large enough to satisfy a triggering test for applying a template that defines the alternative representation 160.

Figure 2:
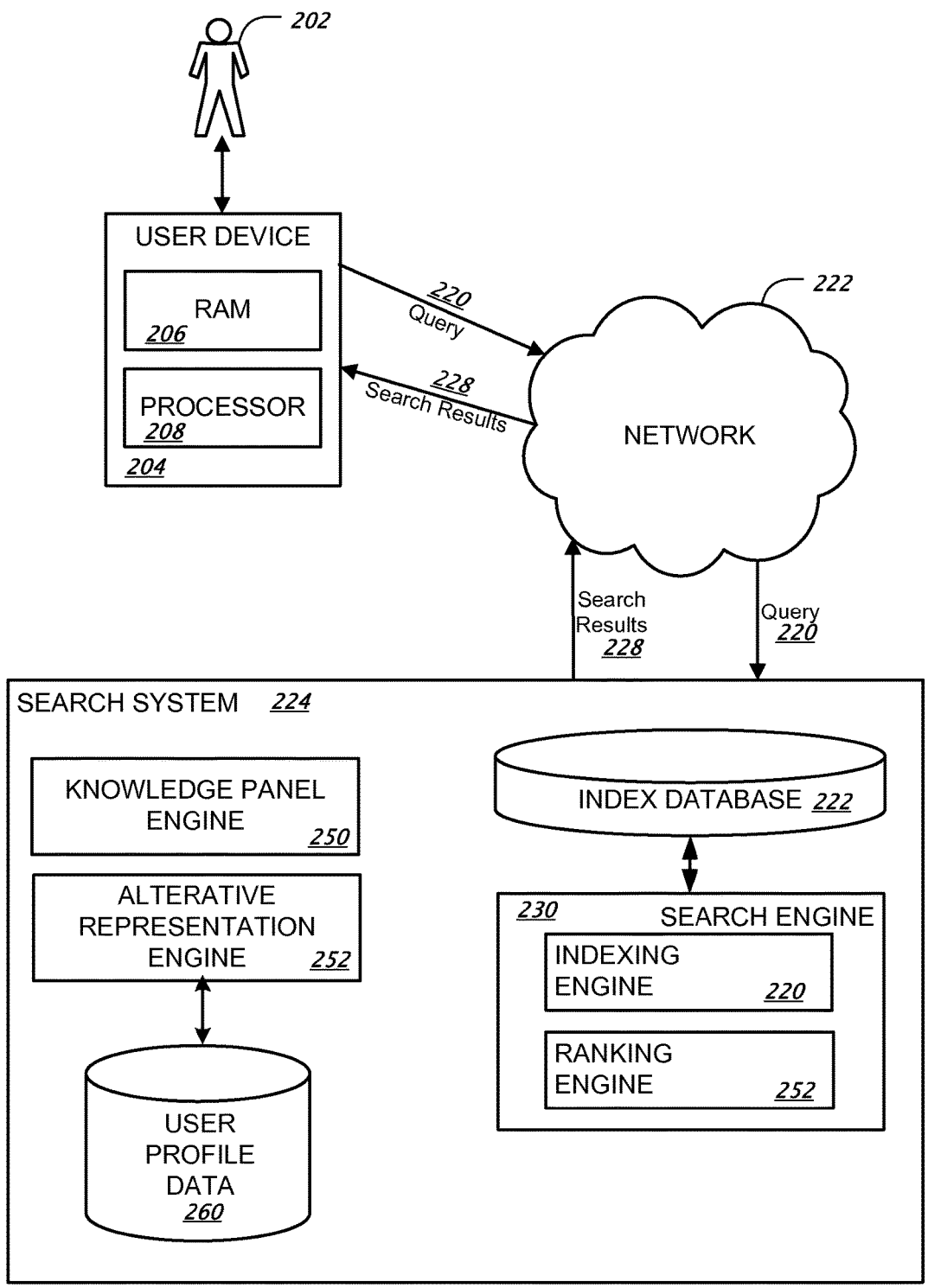
FIG. 2 shows an example search system.

FIG. 2 shows an example search system 214. The search system 214 is an example of an information retrieval system implemented as computer programs on one or more computers in one or more locations, in which the systems, components, and techniques described below can be implemented.

A user 202 can interact with the search system 214 through a user device 204. The user device 204 will generally include a memory, e.g., a random access memory (RAM) 206, for storing instructions and data and a processor 208 for executing stored instructions. The memory can include both read only and writable memory. For example, the user device 204 can be a computer coupled to the search system 214 through a data communication network 212, e.g., local area network (LAN) or wide area network (WAN), e.g., the Internet, or a combination of networks, any of which may include wireless links.

In some cases, the search system 214 can be implemented on the user device 204, for example, if a user installs an application that performs searches on the user device 204.

In some implementations, the search system 214 provides a user interface to the user device 204 through which the user 202 can interact with the search system 214. For example, the search system 214 can provide a user interface in the form of web pages that are rendered by a web browser running on the user device 204.

A user 202 can use the user device 204 to submit a query 210 to a search system 214. A search engine 230 within the search system 214 performs a search to identify resources matching the query. When the user 202 submits a query 210, the query 210 may be transmitted through the network 212 to the search system 224. The search system 214 includes an index database 222 and the search engine 230. The search system 214 responds to the query 210 by generating search results 218, which are transmitted through the network to the user device 204 for presentation to the user 202, e.g., as a search results web page to be displayed by a web browser running on the user device 204.

In this specification, the term "database" will be used broadly to refer to any collection of data: the data does not need to be structured in any particular way, or structured at all, and it can be stored on storage devices in one or more locations. Thus, for example, the index database 222 can include multiple collections of data, each of which may be organized and accessed differently. Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

When the query 210 is received by the search engine 230, the search engine 230 identifies resources that satisfy the query 210. The search engine 230 will generally include an indexing engine 220 that indexes resources, an index database 222 that stores the index information, and a ranking engine 252 or other software that generates scores for the resources that satisfy the query 210 and that ranks the resources according to their respective scores.

The search system 214 also includes or can communicate with a knowledge panel engine 250 that generates knowledge panels in response to particular queries. The knowledge panel engine 250 can classify an entity as being relevant to a received query and generate a knowledge panel that includes content that relates to the relevant entity. As part of generating the knowledge panel, the knowledge panel engine 250 selects certain attributes of the relevant entity as presentation attributes, i.e., attributes whose values will be presented to the user in the knowledge panel.

Registered users of the search system 214 may provide data to the search system that is stored in a user profile data database 260. That is, the user 202 may log in to a user account with the search system 214, e.g., through a web browser executing on the user device 204, and provide data identifying values of particular user attributes, e.g., the user's birthday, the user's city of residence, places the user has vacationed, and so on, that are stored in the user profile data database 260. Optionally, the user profile database 260 may also store data identifying other users in the user 202's social network and attribute values that those users have provided to the search system 214.

When a search query is received from a registered user of the system, i.e., while the user is logged in to a user account, the knowledge panel engine 250 provides data identifying the presentation attributes and their values to an alternative representation engine 252. The alternative representation engine 252 may select alternative textual representations for one or more of the presentation attribute values based on the user profile data for the user that is stored in the user profile data database 260. Selecting textual representations based on user profile data is described below with reference to FIGS. 3 and 4. Optionally, if the search system 214 receives a search query from a user for whom no profile data or limited profile data is stored in the user profile data database 260, the alternative representation engine 252 may, as described in more detail below, infer user attribute values for the user from attribute values of the user device from which the search query is received. The alternative representation engine 252 may then use the inferred user attribute values in place of user profile data to select the alternative representations.

Figure 3:
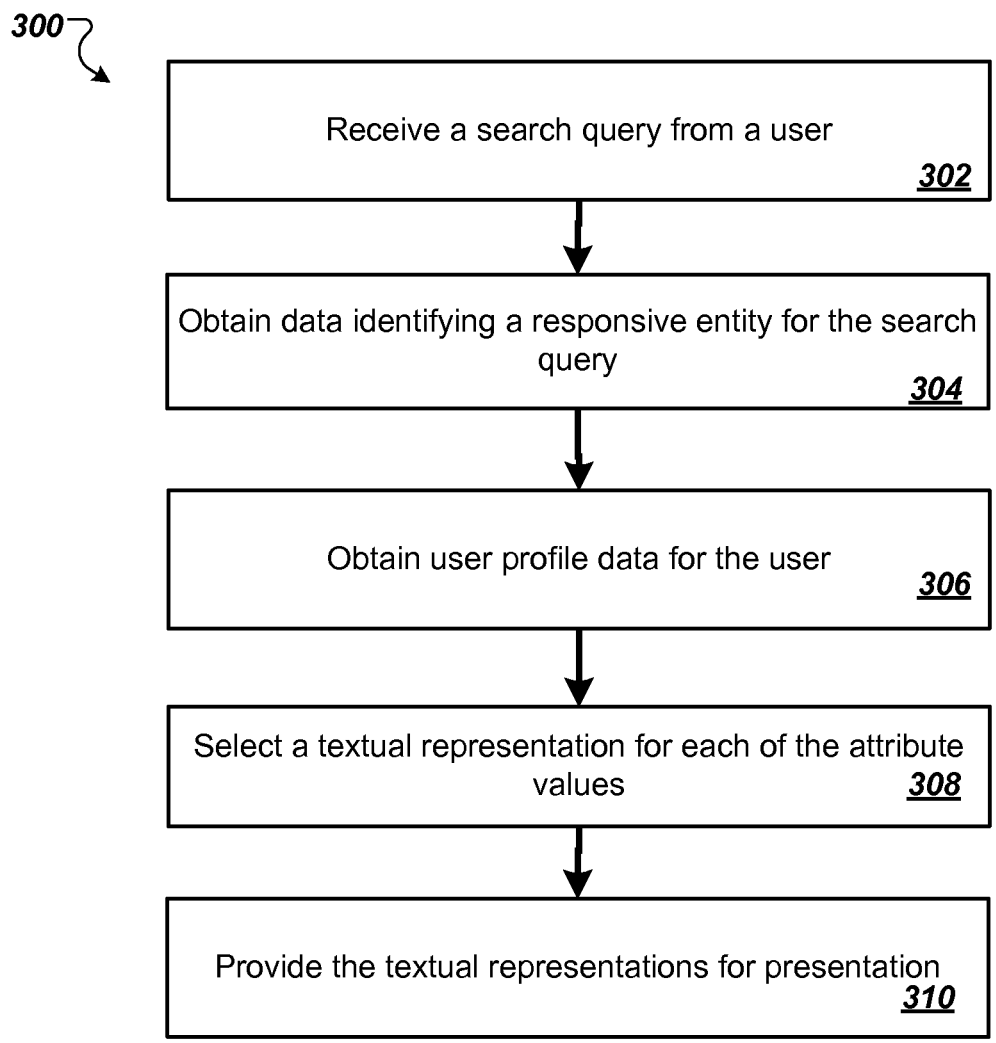
FIG. 3 is a flow diagram of an example process for selecting textual representations to include in a knowledge panel.

FIG. 3 is a flow diagram of an example process 300 for selecting textual representations to include in a knowledge panel. For convenience, the process 300 will be described as being performed by a system of one or more computers located in one or more locations. For example, a search system, e.g., the search system 214 of FIG. 2, appropriately programmed in accordance with this specification, can perform the process 300.

The system receives a search query from a user of a user device (step 302). The search query is received while the user is logged into a user account on the user device.

The system obtains data identifying a relevant entity for the search query and values of one or more attributes associated with the relevant entity (step 304). The values are values of attributes that have been selected as presentation attributes, i.e., values of attributes that will be presented to the user as part of a response to the search query.

The system obtains user profile data for the user (step 306). That is, the system obtains values of one or more user attributes associated with the user account from a user profile database, e.g., the user profile database 260 of FIG. 2.

The system selects a respective textual representation for each of the attribute values (step 308). That is, the system determines, for each of the attribute values, whether to select the default representation for the attribute value or an alternative representation for the attribute value. Each attribute value may be associated with a respective default textual representation based on, e.g., the user interface language of the user interface used to submit the search query.

In order to determine whether to select an alternative representation, and if so, which alternative representation to select, the system can determine whether the entity attribute values and the user attribute values satisfy the triggering test for any of a pre-determined set of templates. Each template defines a respective alternative representation for a value of an entity attribute and has a respective triggering test for applying the template. Optionally, the triggering test for one or more of the templates may be satisfied by values of particular attributes of social network friends of the user in addition to or instead of user attribute values. Using templates to select a textual representation for an entity attribute value is described below with reference to FIG. 4.

The system provides the selected textual representations for presentation to the user (step 310). For example, the textual representations may be presented as part of a knowledge panel that identifies the relevant entity and includes content that is relevant to the relevant entity.

Figure 4:
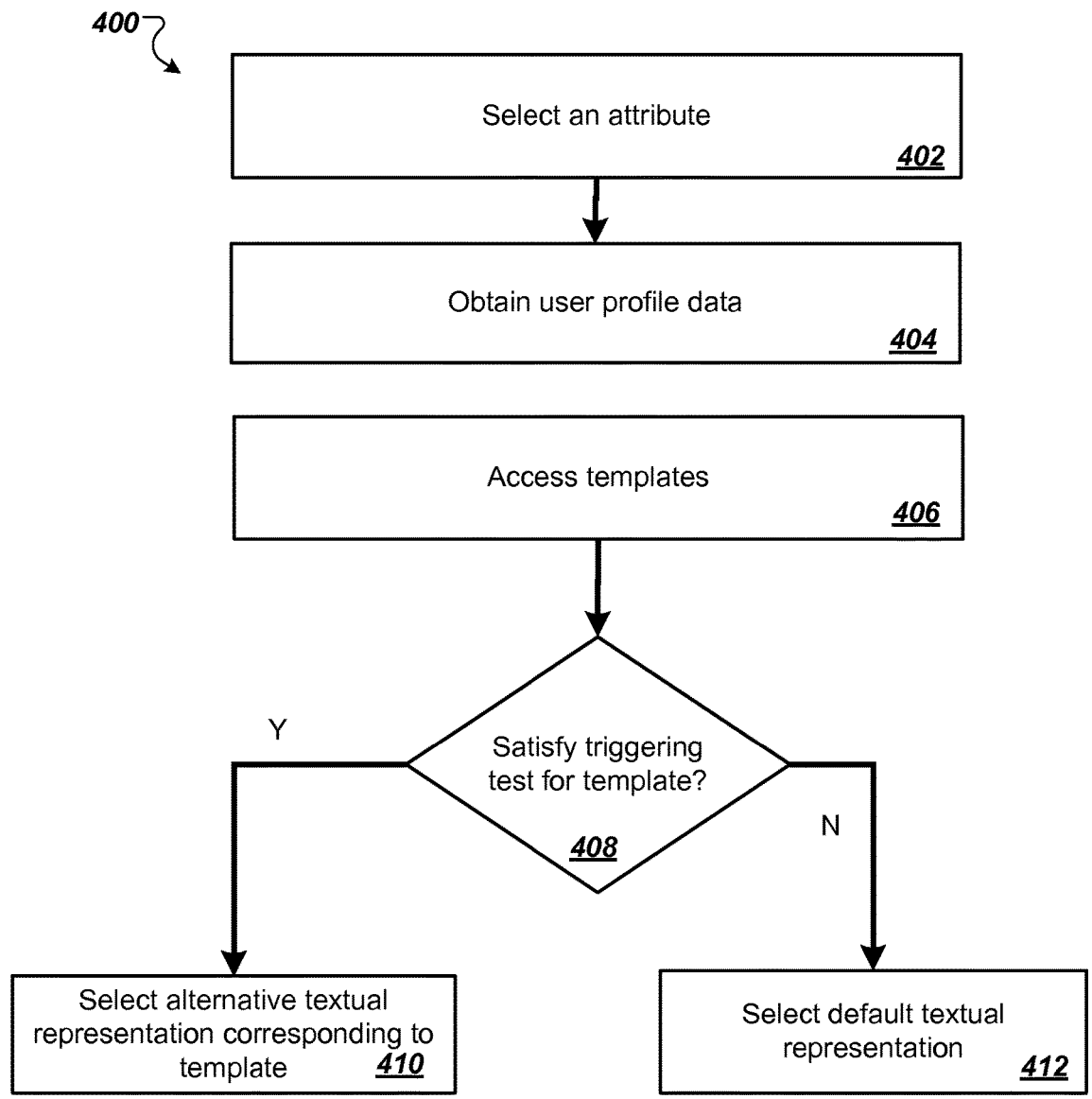
FIG. 4 is a flow diagram of an example process for selecting a textual representation for an attribute value based on user profile data.

FIG. 4 is a flow diagram of an example process 400 for using templates to select a textual representation for a value of an entity attribute. For convenience, the process 400 will be described as being performed by a system of one or more computers located in one or more locations. For example, a search system, e.g., the search system 214 of FIG. 2, appropriately programmed in accordance with this specification, can perform the process 400.

The system obtains values of one or more user attributes (step 402). The user attributes values are obtained from user profile data for a user.

The system accesses a set of templates (step 404). In some implementations, the system may maintain multiple sets of templates, each of which is specific to a respective entity type. For example, the system may maintain one set of templates for entities of the type "city" and a different set of templates for entities of the type "person." In these implementations, the system may determine the type of the related entity and access the set of templates that is specific to that type.

As described above, each template in the set of templates has a respective triggering test. The triggering test for a given template may have multiple parts. Generally, the triggering test specifies one or more criteria for the value of a measure of relatedness between the value of a particular entity attribute and the value of a particular user attribute. For example, the triggering test may specify that the value of the measure of relatedness be above or below a threshold value. Optionally, the triggering test may also specify one or more criteria for the value of the particular entity attribute, the value of the particular user attribute, or both.

Depending on the implementation and on the attributes that are being compared, the system can calculate the measure of relatedness based on any of a variety of factors.

For example, the system may calculate the measure of relatedness between the value of a "location" entity attribute and the value of a "city of residence" user attribute based at least in part on the distance between the value of a "location" entity attribute and the value of the "city of residence" user attribute. The distance may be measured, e.g., in terms of a straight-line distance between the two locations, a driving distance or estimated driving time between the two locations, or in terms of travel distance or estimated travel time of another mode of transportation. The measure of relatedness may also be based on the size of the "city of residence" attribute value, the size of the "location" attribute value, or both.

As another example, the system may calculate the measure of relatedness between the value of a "publication date" entity attribute for a book entity or a movie entity and a "birthdate" user attribute based on the time difference between the two values. As another example, the measure of relatedness between the value of a "birthdate" entity attribute or other entity attribute having a date value and a "city of residence" attribute may be based on whether the date is of particular importance in the city or country in which the user resides, e.g., a national or local holiday, the birthday of a person that is well-known in the country, or is of some other historical significance in the city or country.

As another example, the system may calculate the measure of relatedness between two attributes having values that are names of people based on the origin of the names, e.g., based on whether or not the two names are variations of the same name or on whether one of the names is a representation of the other name in a different language.

As another example, the system may calculate the measure of relatedness based at least in part on how frequently the value of the user attribute and the value of the entity attribute co-occur in resources indexed in a resource index, e.g., the index database 222 of FIG. 2.

As another example, the system may use user feedback in determining the measure of relatedness between two attribute values. For example, the presentation attribute values may be displayed to the user as links, e.g., as links that, when selected by the user, submit a search query that includes the presentation attribute value to a search engine. In these cases, the system may determine the measure of relatedness between two attribute values based on how frequently users select one attribute value when the other attribute value is the relevant entity for the search query.

As another example, in some implementations, one or more of the templates may be determined to be more likely to appeal to certain user groups, e.g., "young adults from the United States" or "female technology aficionados." The triggering test for those templates may then be satisfied only if the user belongs to a certain user group. In these implementations, the system may classify the user as belonging to a particular user group from the values of the user attributes included in the user profile data, e.g., using traditional clustering techniques, and may determine whether the triggering test for those templates is satisfied based on whether the particular user group to which the user belongs matches the user group identified in the triggering test for the template.

The system determines whether the value of the entity attribute and the values of the user attributes satisfy the triggering test for any of the templates (step 408). That is, the system determines whether the value of the entity attribute, when taken in combination with the value of any of the user attributes, satisfy the triggering test for any of the templates.

If the triggering test for one of the templates is satisfied, the system selects the alternative textual representation for the value of the attribute that is defined by the template (step 410).

Generally, an alternative textual representation for an attribute value is in the same language as the default representation for the attribute value but provides a level of detail that is different from the level of detail offered by the default representation. For example, one template might define an alternative representation for the value of a "birthplace" attribute that has a default textual representation of "[name of Relevant Entity] was born in [value of "birthplace attribute"]." The alternative representation defined by the template might be "[name of Relevant Entity] was born in [value of "birthplace attribute"], which is [distance to nearest city with population over one million] from [name of nearest city with population over one million]."

If more detailed information is available regarding the birthplace, i.e., the street address or neighborhood where the entity was born, another alternative representation defined by another template having a different triggering test might be "[name of Relevant Entity] was born in the [name of neighborhood where relevant entity was born] neighborhood of [city where relevant entity was born]." Thus, in order to provide an alternative textual representation for presentation, the system may obtain information required to complete the representation, e.g., information identifying the distance to the nearest city with population over one million.

Optionally, some or all of the templates may define a user-specific textual representation. A user-specific representation is a representation having text that depends on the value of a particular user attribute. For example, a user-specific textual representation for the value of the "birthplace" attribute might be "[name of Relevant Entity] was born in [value of "birth place attribute"], which is located [distance] from your [nearest of city user lives in or cities user has visited]."

If the triggering test for more than one of the templates is satisfied, the system can select one of the templates based on a pre-determined hierarchy of templates or, alternatively, can select more than one alternative representation. That is, if the triggering test for two alternative representations is satisfied, the system may display the alternative representation defined by both templates.

If none of the triggering tests are satisfied, the system selects a default textual presentation for the value of the attribute (step 412).

An example template available to the system may have a triggering test that specifies that the template be triggered when the relevant entity is of the type "person," the value of a "city of birth" entity attribute has a population that is less than 200,000 people, and the value of a "current location" or "city of residence" user attribute is located more than 50 miles from the value of the "city of birth" entity attribute but less than 75 miles from the value of the "city of birth" attribute. The template may specify that, when the triggering test is met, in place of the default representation of the relevant entity's city of birth attribute value, the alternative representation "born: <entity's city of birth>, <time to commute to user's location>drive <general direction of drive from entity's city of user's location> from <current location of user or city of residence of the user>."

Thus, when a query is received for which John Steinbeck is the relevant entity from a user whose current location is in Mountain View, Calif., instead of displaying the default representation for the John Steinbeck's city of birth, e.g., "Born: Salinas, Calif.," the system may determine that the triggering test for the example template is met and display the alternative representation "Born: Salinas Calif., 1hr drive south from your current location."

The above description describes selecting textual representations based on user profile data. However, in some circumstances, the system may receive a search query from a user for whom no profile data or limited profile data is stored in the user profile data store. For example, the search query may be received from a user who has not provided any profile information or from a user who is not logged in. In these cases, the system may optionally infer user attribute values for the user from attribute values of the user device from which the search query is received or from the network over which the user device submits the search query. For example, the system may infer the value of a current location or "locations user knows about" attribute for the user from the IP (Internet Protocol) address of the user device or from Global Positioning System (GPS) coordinates obtained for the user device. As another example, the system may infer the value of one or more user attributes from recent search history associated with the user device, e.g., recent search queries received from the user device, or from information stored in a cookie received from the user device.

In situations in which the systems described here collect personal information about users, or may make use of personal information, the users may be provided with an opportunity to control whether programs or features collect user information, e.g., information about a user's social network, social actions or activities, profession, a user's preferences, or a user's current location, or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained, such as to a city, postal code, or state level, so that a particular location of a user cannot be determined. Thus, the user may have control over how information is collected about the user and used by a content server.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    receiving a search query from a user device;
    receiving, for presentation to a user of the user device, (i) data identifying an entity that is relevant to the search query and (ii) a respective presentation attribute value for each of a plurality of presentation attributes associated with the entity;
    obtaining a first default textual representation of a first presentation attribute value for a first presentation attribute of the plurality of presentation attributes;
    obtaining user profile data for the user;
    selecting a respective textual representation for each of the presentation attribute values, wherein selecting the textual representations comprises:
        selecting a first alternative textual representation for the first presentation attribute value instead of the first default textual representation based on a measure of relatedness between the first presentation attribute value and a first user attribute value identified in the user profile data, wherein the first alternative textual representation is a textual representation of the first presentation attribute value that provides a level of detail about the first presentation attribute value that is different from a level of detail provided by the first default textual representation; and
    providing the data identifying the entity and the selected textual representations for presentation as part of a knowledge panel that identifies the entity and includes content that is relevant to the entity.

2. The method of claim 1, wherein the user profile data for the user comprises a respective user attribute value for each of one or more user attributes associated with the user.

3. The method of claim 2, wherein selecting the first alternative textual representation for the first presentation attribute value based on the user profile data comprises:
    accessing data identifying one or more templates, wherein each template defines a respective alternative textual representation for a respective presentation attribute, and wherein each template has a respective triggering test for applying the template;
    determining that the first presentation attribute value and the one or more user attribute values satisfy the triggering test for applying a first template from among the plurality of templates; and
    selecting the alternative textual representation defined by the first template as the textual representation for the first presentation attribute value.

4. The method of claim 3, wherein the triggering test for applying the first template comprises a criterion for the measure of relatedness between the first presentation attribute value and the first user attribute value of the respective user attribute values.

5. The method of claim 3, wherein the alternative textual representation defined by the first template is a user-specific representation, a user-specific representation being a representation having text that depends on the value of a particular user attribute.

6. The method of claim 3, further comprising obtaining a default textual representation for each of the presentation attribute values.

7. The method of claim 1, wherein the first alternative textual representation for the first presentation attribute value is in a same natural language as the first default textual representation for the first presentation attribute value.

8. The method of claim 6, wherein selecting a respective textual representation for each of the presentation attribute values further comprises:
    determining that a second presentation attribute value does not satisfy the triggering test for applying any of the plurality of templates; and
    selecting the default textual representation for the second presentation attribute value as the textual representation for the second presentation attribute value.

9. The method of claim 4, further comprising:
    determining that the user profile data does not include a value for the first user attribute value; and
    inferring the first user attribute value from attribute values of a user device of the user or a network connection of the user device.

10. A system comprising one or more computers and one or more non-transitory storage devices storing instructions that when executed by the one or more computers cause the one or more computers to perform operations comprising:

receiving a search query from a user device;

receiving, for presentation to a user of the user device, (i) data identifying an entity that is relevant to the search query and (ii) a respective presentation attribute value for each of a plurality of presentation attributes associated with the entity;

obtaining a first default textual representation of a first presentation attribute value for a first presentation attribute of the plurality of presentation attributes;

obtaining user profile data for the user;

selecting a respective textual representation for each of the presentation attribute values, wherein selecting the textual representations comprises:

selecting a first alternative textual representation for the first presentation attribute value instead of the first default textual representation based on a measure of relatedness between the first presentation attribute value and a first user attribute value identified in the user profile data, wherein the first alternative textual representation is a textual representation of the first presentation attribute value that provides a level of detail about the first presentation attribute value that is different from a level of detail provided by the first default textual representation; and providing the data identifying the entity and the selected textual representations for presentation as part of a knowledge panel that identifies the entity and includes content that is relevant to the entity.

11. The system of claim 10, wherein the user profile data for the user comprises a respective user attribute value for each of one or more user attributes associated with the user.

12. The system of claim 11, wherein selecting the first alternative textual representation for the first presentation attribute value based on the user profile data comprises:

accessing data identifying one or more templates, wherein each template defines a respective alternative textual representation for a respective presentation attribute, and wherein each template has a respective triggering test for applying the template;

determining that the first presentation attribute value and the one or more user attribute values satisfy the triggering test for applying a first template from among the plurality of templates; and selecting the alternative textual representation defined by the first template as the textual representation for the first presentation attribute value.

13. The system of claim 12, wherein selecting a respective textual representation for each of the presentation attribute values further comprises:

determining that a second presentation attribute value does not satisfy the triggering test for applying any of the plurality of templates; and selecting a default textual representation for the second presentation attribute value as the textual representation for the second presentation attribute value.

14. A non-transitory computer storage medium encoded with a computer program, the program comprising instructions that when executed by one or more computers cause the one or more computers to perform operations comprising:

receiving a search query from a user device;

receiving, for presentation to a user of the user device, (i) data identifying an entity that is relevant to the search query and (ii) a respective presentation attribute value for each of a plurality of presentation attributes associated with the entity;

obtaining a first default textual representation of a first presentation attribute value for a first presentation attribute of the plurality of presentation attributes;

obtaining user profile data for the user;

selecting a respective textual representation for each of the presentation attribute values, wherein selecting the textual representations comprises:

selecting a first alternative textual representation for the first presentation attribute value instead of the first default textual representation based on a measure of relatedness between the first presentation attribute value and a first user attribute value identified in the user profile data, wherein the first alternative textual representation is a textual representation of the first presentation attribute value that provides a level of detail about the first presentation attribute value that is different from a level of detail provided by the first default textual representation; and providing the data identifying the entity and the selected textual representations for presentation as part of a knowledge panel that identifies the entity and includes content that is relevant to the entity.

15. The computer storage medium of claim 14, wherein the user profile data for the user comprises a respective user attribute value for each of one or more user attributes associated with the user.

16. The computer storage medium of claim 15, wherein selecting the first alternative textual representation for the first presentation attribute value based on the user profile data comprises:

accessing data identifying one or more templates, wherein each template defines a respective alternative textual representation for a respective presentation attribute, and wherein each template has a respective triggering test for applying the template;

determining that the first presentation attribute value and the one or more user attribute values satisfy the triggering test for applying a first template from among the plurality of templates; and selecting the alternative textual representation defined by the first template as the textual representation for the first presentation attribute value.

17. The computer storage medium of claim 16, wherein selecting a respective textual representation for each of the presentation attribute values further comprises:

determining that a second presentation attribute value does not satisfy the triggering test for applying any of the plurality of templates; and selecting a default textual representation for the second presentation attribute value as the textual representation for the second presentation attribute value.

18. The method of claim 1, wherein the first presentation attribute value and the first user attribute value identified in the user profile data are respective geographic locations, and wherein the measure of relatedness is a distance between the first presentation attribute value and the first user attribute value.

19. The system of claim 12, wherein the triggering test for applying the first template comprises a criterion for the measure of relatedness between the first presentation attribute value and the first user attribute value of the respective user attribute values.

20. The system of claim 12, wherein the alternative textual representation defined by the first template is a user-specific representation, a user-specific representation being a representation having text that depends on the value of a particular user attribute.

21. The system of claim 12, the operations further comprising obtaining a default textual representation for each of the presentation attribute values.

22. The system of claim 10, wherein the first alternative textual representation for the first presentation attribute value is in a same natural language as the first default textual representation for the first presentation attribute value.

23. The computer storage medium of claim 16, wherein the triggering test for applying the first template comprises a criterion for the measure of relatedness between the first presentation attribute value and the first user attribute value of the respective user attribute values.

24. The computer storage medium of claim 16, wherein the alternative textual representation defined by the first template is a user-specific representation, a user-specific representation being a representation having text that depends on the value of a particular user attribute.

25. The computer storage medium of claim 16, the operations further comprising obtaining a default textual representation for each of the presentation attribute values.

26. The computer storage medium of claim 14, wherein the first alternative textual representation for the first presentation attribute value is in a same natural language as the first default textual representation for the first presentation attribute value.

* * * * *